United States Patent
Kashanian et al.

(10) Patent No.: US 7,403,767 B2
(45) Date of Patent: Jul. 22, 2008

(54) CELLULAR TELEPHONE NETWORK WITH RECORD KEEPING FOR MISSED CALLS

(75) Inventors: Nematolah Kashanian, Hackensack, NJ (US); Sima Ybarra, San Diego, CA (US); Jibu Joseph, San Diego, CA (US); Anand Desikan, San Diego, CA (US); Utpal Das, Uttar Pradesh (IN)

(73) Assignee: Siemens Aktiengesellschaft, Munich (DE)

( * ) Notice: Subject to any disclaimer, the term of this patent is extended or adjusted under 35 U.S.C. 154(b) by 61 days.

(21) Appl. No.: 11/117,922

(22) Filed: Apr. 29, 2005

(65) Prior Publication Data

US 2006/0246877 A1 Nov. 2, 2006

(51) Int. Cl.
*H04Q 7/20* (2006.01)
(52) U.S. Cl. .................. 455/412.2; 455/414.1
(58) Field of Classification Search .................. 455/415, 455/417, 566, 412.1, 567, 413, 563, 412.2, 455/421, 564, 414.1, 450, 452, 509, 512–516, 455/588, 554
See application file for complete search history.

(56) References Cited

U.S. PATENT DOCUMENTS

| | | | | |
|---|---|---|---|---|
| 6,321,093 | B1 * | 11/2001 | Dalal | 455/512 |
| 6,728,349 | B2 * | 4/2004 | Chang et al. | 379/93.23 |
| 6,799,017 | B1 | 9/2004 | Kregel | |
| 2002/0077086 | A1 * | 6/2002 | Tuomela et al. | 455/414 |
| 2004/0077340 | A1 * | 4/2004 | Forsyth | 455/414.1 |
| 2004/0110489 | A1 | 6/2004 | Murri et al. | |
| 2004/0203651 | A1 * | 10/2004 | Qu et al. | 455/414.1 |
| 2004/0242211 | A1 | 12/2004 | Akhteruzzaman et al. | |
| 2005/0020316 | A1 * | 1/2005 | Mahini | 455/566 |

* cited by examiner

*Primary Examiner*—Naghmeh Mehrpour (57) ABSTRACT

A method of operating a cellular telephone system includes detecting that a first telephone call to a cellular telephone cannot be completed due to a lack of wireless connection to the cellular telephone. The method further includes detecting that the cellular telephone is re-connected to the system. In response to detecting that the cellular telephone is re-connected, data is sent to the cellular telephone, the data being indicative of the first telephone call. The method also includes storing the data in a missed call list in the cellular telephone.

20 Claims, 8 Drawing Sheets

FIG. 7

CELLULAR TELEPHONE NETWORK WITH RECORD KEEPING FOR MISSED CALLS

TECHNICAL FIELD

The present disclosure relates generally to cellular telephone systems and, more particularly, to handling of missed calls in cellular telephone systems.

BACKGROUND

Various techniques have been proposed for handling missed calls in cellular telephone networks, but none has provided an integrated approach that provides cellular phone users with seamless record-keeping for all missed calls, whether resulting from failure to answer, rejection of the call, absence of the intended recipient phone from service coverage areas, or the intended recipient phone being in a power-off condition.

SUMMARY

Methods, systems, and computer program code are therefore presented for improving handling of missed calls.

According to some embodiments, the methods, systems and computer program code operate to: detect that a first telephone call to a cellular telephone cannot be completed due to a lack of wireless connection to the cellular telephone; detect that the cellular telephone is re-connected to the cellular telephone system; in response to detecting that the cellular telephone is re-connected to the system, send to the cellular telephone data that is indicative of the first telephone call; and store at least some of the data in a missed call list in the cellular telephone.

The lack of wireless connection may be because the cellular telephone is turned off, or because it is out of the service area of the system.

According to some embodiments, the user of the cellular telephone may initiate a telephone call from the cellular telephone to a sender of the first telephone call by interacting with an item in the missed call list that corresponds to the first telephone call. In some embodiments, there may be stored in the missed call list data which represents a second telephone call that was missed as a result of a user of the cellular telephone failing to answer the second telephone call. The cellular telephone may simultaneously display on a display component of the cellular telephone a first missed call list item which corresponds to the first telephone call and a second missed call list item which corresponds to the second telephone call. The first missed call list item may include a first icon, and the second missed call list item may include a second icon that has a different appearance from the first icon. In addition, a third missed call list item may be displayed. The third missed call list item may correspond to a third telephone call for which the sender of the call did not leave a voice mail message. The third missed call list item may include a third icon which has a different appearance from the first and second icons.

According to some embodiments, a cellular telephone may be operated so as to receive a data message, where the data message includes data that represents a first telephone call to the cellular telephone, the first telephone call having failed to be completed due to a lack of wireless connection to the cellular telephone. The cellular telephone may be further operated to store at least some of the data in a missed call list in the cellular telephone.

BRIEF DESCRIPTION OF THE DRAWINGS

Further aspects of the instant system will be more readily appreciated upon review of the detailed description of the preferred embodiments included below when taken in conjunction with the accompanying drawings, of which.

DETAILED DESCRIPTION

According to some embodiments, a cellular telephone network keeps a record, at least temporarily, of calls that cannot be completed because the intended recipient phone is not in communication with the system. The intended recipient phone may be out of communication because it is turned off, or because it is outside of the area in which signals from the system's antennas can be received.

When the intended recipient phone is restored to communication with the system, the system may program the phone so that it stores data regarding the missed calls. The data may be stored in the missed call list maintained by the phone. The missed call list may also include items that correspond to other missed calls, including calls missed because the user of the phone rejected the calls or did not answer when the phone rang. When the list is displayed, the list items may include icons to indicate which missed calls were due to the phone being out of communication, versus which missed calls were rejected/not answered. The list items may also include an icon or icons to indicate calls for which voice mail messages were or were not left by the caller.

Figure 1:
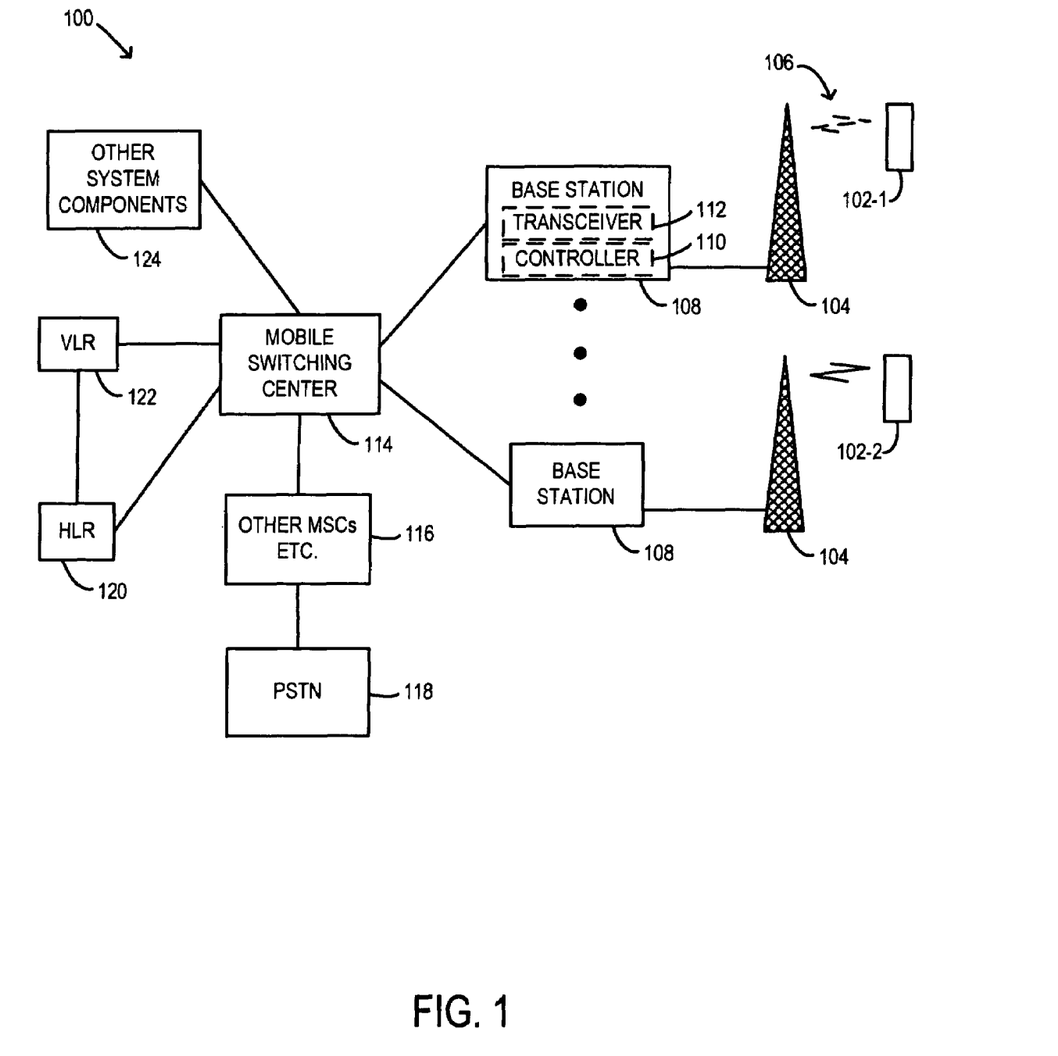
FIG. 1 is a simplified block diagram of a cellular phone system in connection with which aspects of the present invention may be applied.

FIG. 1 is a simplified block diagram of a cellular phone system 100 in connection with which aspects of the present invention may be applied. The system 100 includes and services cellular phones 102 (sometimes referred to as "mobile stations"), which may be in communication with the system via antennas 104. (The wireless channel at 106 is shown in phantom to indicate that the wireless channel may be interrupted due to, e.g., the phone 102-1 being turned off or carried outside the system's service area.)

Each antenna 104 is connected to a base station sub-system 108. (Although not indicated in FIG. 1, in some cases base stations may control more than one antenna.) Components included in a typical base station 108 are a base station controller 110 and a base transceiver station 112.

The base stations in turn are connected to a mobile switching center (MSC) 114 which handles telephone call traffic and other communications to and from cellular phones served from time to time by base stations connected to the mobile switching center.

The cellular phone system 100 also includes other mobile switching centers, represented by block 116. The other mobile switching centers are in communication with each other and with the mobile switching center 114 to manage calls and other communications to and from the cellular phones serviced by the system. The other mobile switching centers may include a so-called "gateway" MSC, by which the system is connected to the public switched telephone network (PSTN) 118. (It will be appreciated that the PSTN 118 includes other cellular phone systems, which are not separately shown, as well as landline telephones, conventional switches and telephone lines, cables, microwave transmission links, and satellite transmission links.)

The mobile switching center 114 also is in communication with a home location register (HLR) 120. The HLR 120 stores data concerning cellular phones whose "home" location is serviced by the MSC 114. The mobile switching center 114 also is in communication with a visited location register (VLR) 122. The VLR 122 stores data concerning cellular phones temporarily brought into the area served by the MSC 114. The MSC 114 may refer to data stored in the HLR 120 and/or the VLR 122 to route calls to or from cellular phones located in the service area of the MSC 114.

The HLR 120 and the VLR 122 are shown as separate from the MSC 114, but may in practice be integrated with the MSC 114. The HLR, VLR and aspects of the MSC may be implemented with one or more server computers. For example, the HLR and VLR may be implemented as separate databases in the same server computer, which may or may not be co-located with the MSC 114.

The cellular phone system 100 may also include other components, represented by block 124. The other system components 124 may be in communication with the MSC 114 and may include, for example, an operations and maintenance center, an authentication center, and an equipment identity register, all of which are not separately shown.

In its hardware aspects, and many of its software aspects, the cellular phone system 100 may be provided in accordance with conventional practices, but one or more server computers in the system 110 may be programmed in accordance with aspects of the present invention to provide functions described below.

Figure 2:
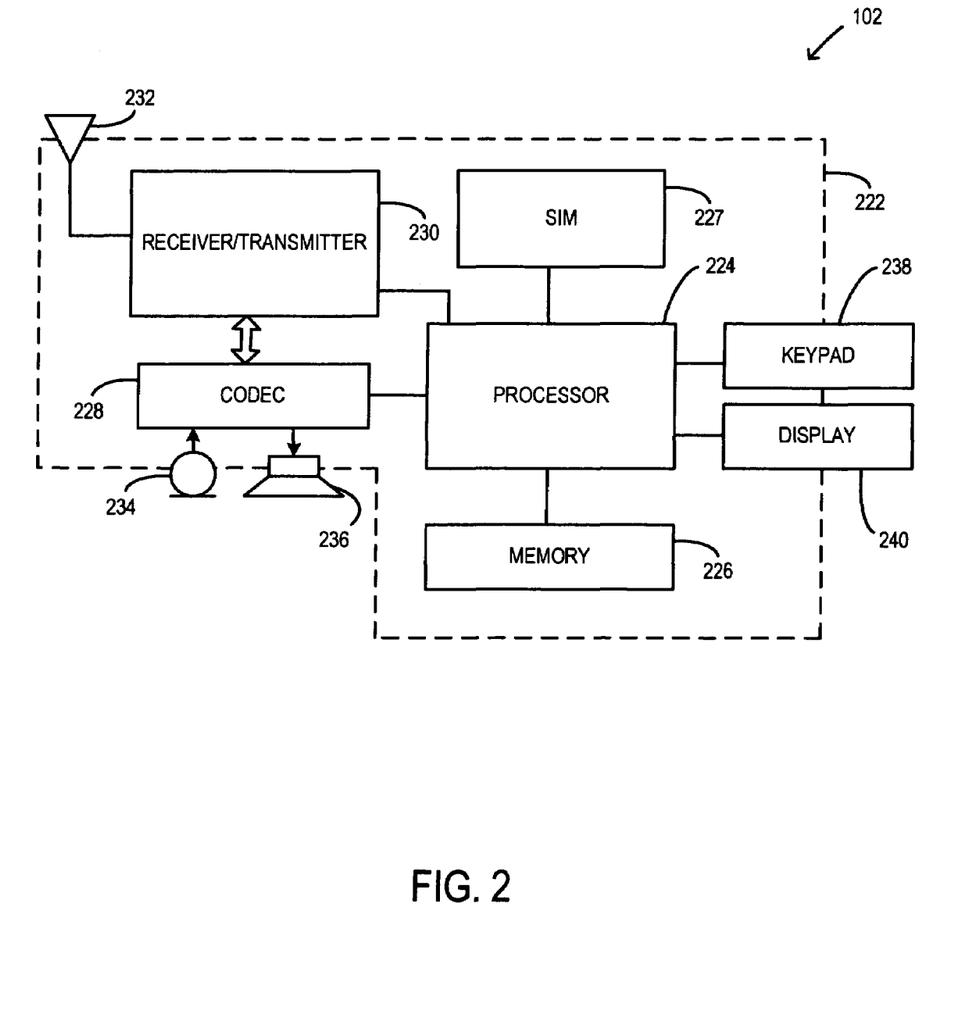
FIG. 2 is a simplified block diagram of a cellular phone that is used in the cellular phone system of FIG. 1.

FIG. 2 is a simplified block diagram of a typical cellular phone 102 that is used in the cellular phone system 100 of FIG. 1.

Reference numeral 102 generally indicates the cellular phone. The cellular phone 102 may be completely or largely conventional in terms of its physical components, and may be programmed to perform certain functions in accordance with aspects of the present invention.

The cellular phone 102 includes a housing 222, which is represented by a dashed line. The housing 222 may be shaped and sized to fit in a user's hand. Other components of the cellular phone 102, which are described below, are mounted on or within the housing 222.

The cellular phone 102 also includes a processor 224, which may be a conventional microprocessor, microcontroller and/or digital signal processor (DSP) or other control circuit conventionally provided in a cellular phone. Also included in the cellular phone 102 are memory components 226, which may include one or more of ROM (read only memory), RAM (random access memory, e.g., static RAM), and flash memory. The processor 224 is in data communication with the memory components 226. The memory components 226 may store software programs that control operation of the processor 224. Some of the software may be conventional. Other portions of the software may be provided in accordance with the present invention to cause the processor 224 to perform functions that are described below. The cellular phone 102 may also include a subscriber identity module (SIM) 227 which may include data that identifies the cellular phone 102 to the cellular phone system 100. The SIM 227, though shown separately, may in practice be integrated with one or more of the memory components 226.

A conventional codec (coder/decoder) 228 is also included in the cellular phone 102 and is in data communication with the processor 224. A conventional receiver/transmitter 230 is operatively coupled to the codec 228 and is also operatively coupled to a conventional antenna 232. The receiver/transmitter 230 is also coupled to the processor 224 to allow the processor to receive data messages, commands, etc. transmitted to the cellular phone 102 from or via the system 100. The receiver/transmitter 230 also allows the processor to transmit data to/via the system 100.

A conventional microphone 234 is operatively coupled to the codec 228 to provide voice input signals to the codec 228. A conventional speaker 236 is also operatively coupled to the codec 228 and is driven by the codec 228 to provide audible output.

The user interface of the cellular phone 102 includes a keypad 238 and a display 240, which are both operatively coupled to the processor 224. The keypad 238 may be a conventional 12-key telephone keypad, by which the user may provide dialing and other input to the processor 224. The keypad may also include one or more soft-keys, as are typically provided. In some embodiments, the display 240 is a touch screen capable of both outputting data to the user under the control of the processor 224 and receiving manual input from the user for the processor 224. In other embodiments, the display 240 is not a touch screen and therefore only outputs data to the user. In such cases, all user inputs, including inputs described below, are provided to the processor 224 via the keypad 238 and/or via other keys or buttons which are not separately shown.

It will be understood that the block diagram representation in FIG. 1 of the cellular phone 102 is simplified in a number of ways. For example, all power, and power management components of the cellular phone 102 are omitted from the drawing.

Figure 3:
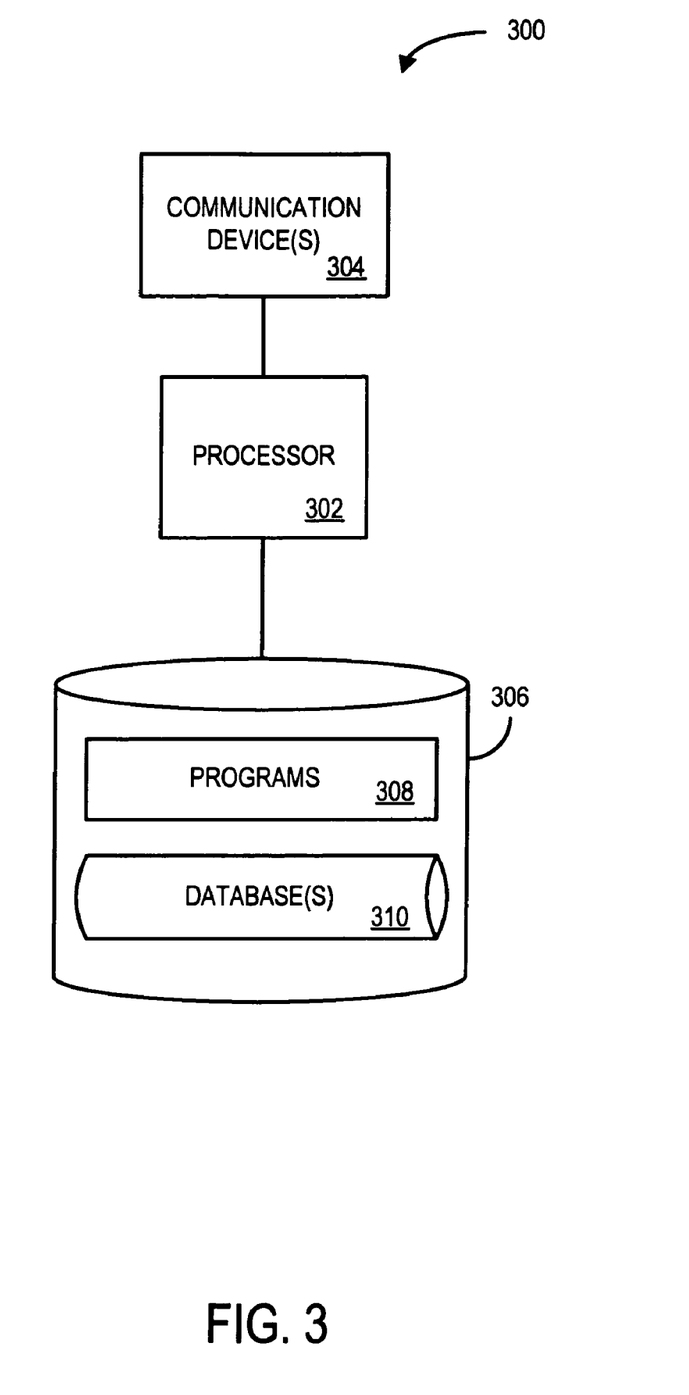
FIG. 3 is simplified block diagram of a server computer that is a component of the cellular phone system of FIG. 1.

FIG. 3 is a simplified block diagram of a server computer 300 that is a component of the cellular phone system 100 of FIG. 1. For example, the server computer 300 may implement one or both of the HLR and VLR. In addition or alternatively, the server computer may implement aspects of a MSC. The server computer may be located at an MSC or elsewhere in the system 100.

As depicted, the server computer 300 includes a computer processor 302 operatively coupled to a communication device 304 and a storage device 306. The computer processor 302 may be a single microprocessor or may comprise two or more microprocessors operating cooperatively and/or in parallel. The communication device 304 may be used to communicate, for example, with other devices such as other components of the cellular phone system 100. The communication device 304 may include one or more data communication ports. The server computer 300 may also include one or more input devices and output devices, which are not shown, and which may include conventional devices such as a display, a keyboard and a mouse.

Storage device 306 may comprise any appropriate information storage device, including combinations of magnetic storage devices (e.g., magnetic tape and hard disk drives), optical storage devices, and/or semiconductor memory devices such as random access memory (RAM) devices and read only memory (ROM) devices.

Storage device 306 stores one or more programs 308 for controlling processor 302. Processor 302 performs instructions of programs 308, and thereby operates in accordance with the present invention.

Storage device 306 also may store one or more databases 310. For example, the databases may store data which constitutes an HLR, a VLR etc. As will be seen, the databases 310 may also store data relating to missed calls.

Figure 4:
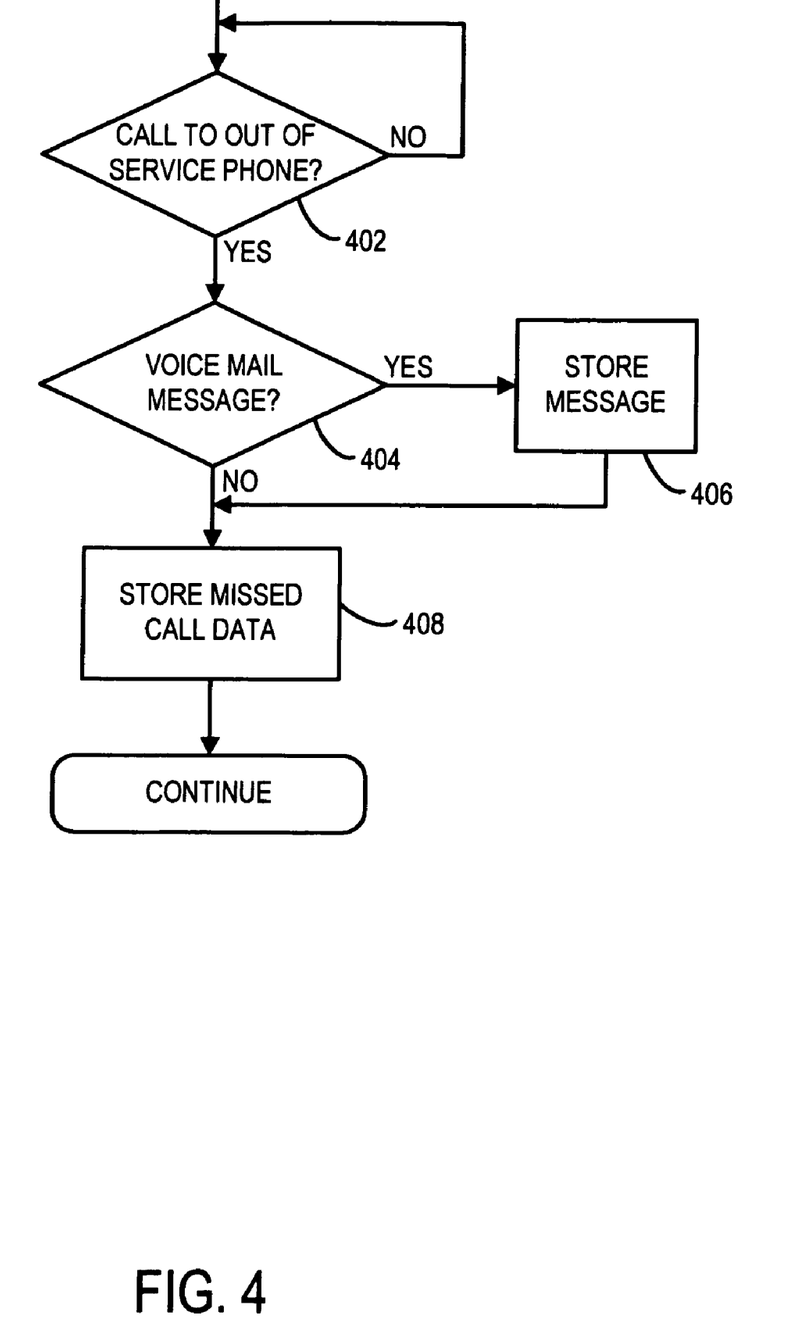
FIGS. 4, 5 and 5A are flowcharts depicting missed call handling processes performed by the server computer of FIG. 3 according to some aspects of the present invention.

FIG. 4 is a flowchart that illustrates a process carried out at least partially in the server computer 300 to handle a missed call.

At 402 in FIG. 4, it is determined whether a call has been made that cannot be completed because the intended recipient cellular phone 102 is out of communication with the system 100. It will be appreciated that this may occur because the cellular phone 102 is turned off, or is at a location from which wireless contact cannot be made with the system 100. The missed call may have originated from another cellular phone 102 of the same system 100, from a cellular phone belonging to another cellular phone system or from a conventional landline phone.

If a positive determination is made at 402 (i.e., if a missed call occurs due to the intended recipient phone being out of communication), then the system may, in accordance with conventional practices, afford the caller (also referred to as the "sender" of the missed call) an opportunity to leave a voice mail message for the intended recipient. Decision block 404 indicates a determination as to whether the caller opts to leave a voice mail message. If so, the voice mail message is stored in accordance with conventional practices, as indicated at 406.

After (or before) the voice mail message is or is not left, data concerning the missed call is stored, as indicated at 408. The data may be stored, for example, in a database 310 (FIG. 3) in the server computer 300. The data may include, for example, the telephone number of the phone which initiated the missed call and the date and time of the call. The data may also include an indication as to whether the caller left a voice mail message.

Figure 5:
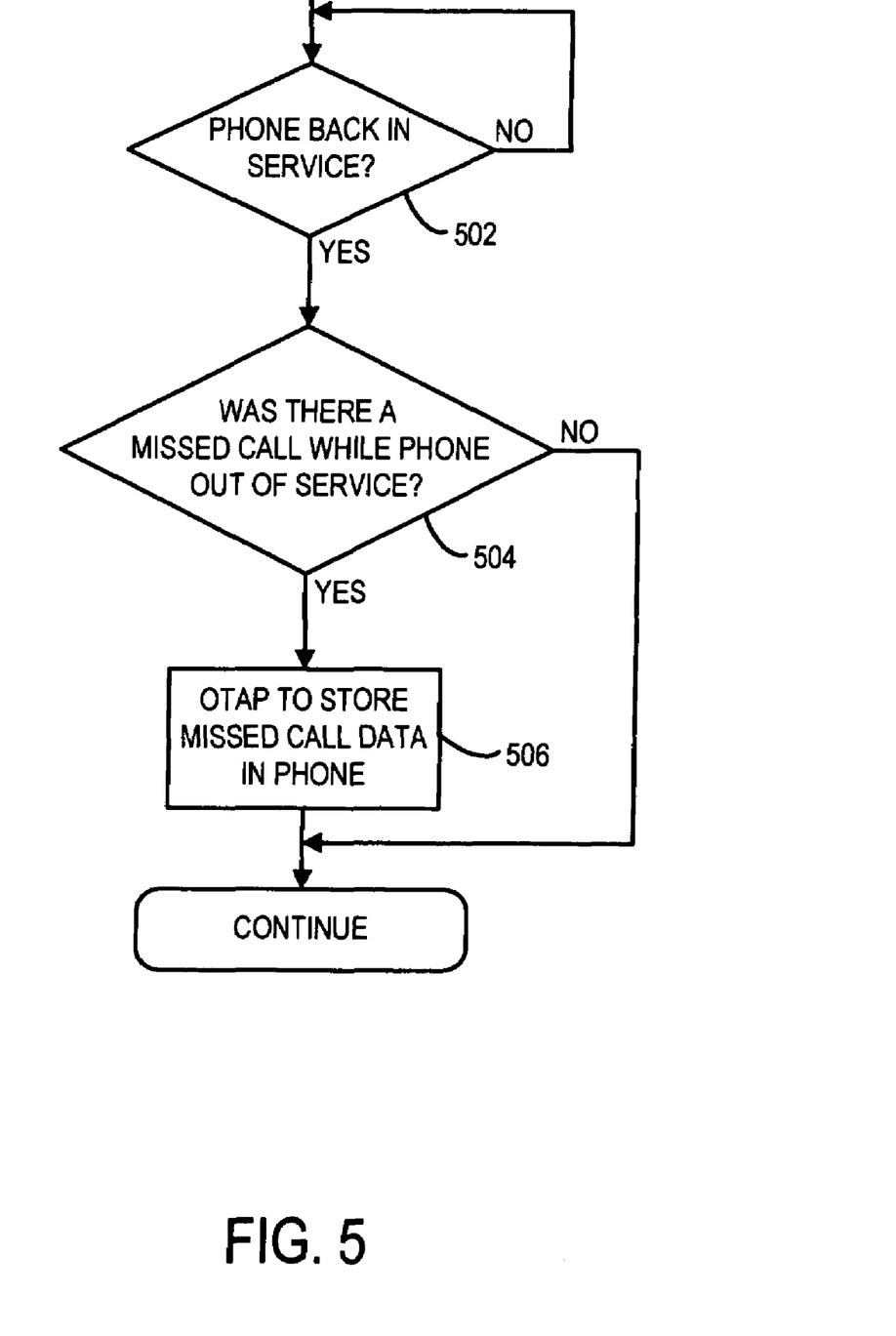

FIG. 5 is a flowchart that illustrates a process performed at least partially by server computer 300 to store data concerning a missed call in the cellular phone 102 that was the intended recipient of the missed call.

At 502 in FIG. 5, it is determined whether a cellular phone 102 that had been out of communication with the system 100 has come back into communication with the system. This may occur, for example, by the cellular phone in question being turned on or brought to a location from which communication with the system 100 is possible. If a positive determination is made at 502 (i.e., if an out-of-service phone is brought back into service), then it is determined, as indicated at 504, whether there were missed calls for the cellular phone in question while it was out of service. For example, the missed call data for each phone may be stored in association with the HLR entry for the phone, and whenever a phone comes back into service, the HLR entry may be checked for (e.g., new) missed call data.

If a positive determination is made at 504 (i.e., if there was at least one missed call), then the system may engage in an over-the-air programming (OTAP) session with the phone in question to download at least some of the missed call data to the phone, as indicated at 506. Such an OTAP session may be considered to include transmission of at least one data message to the phone to download the missed call data. In addition, or alternatively, at least some of the missed call data may be transmitted to the phone by a message protocol such as SMS (short message service), MMS (multimedia messaging service) and/or WAP (wireless application protocol). The missed call data downloaded by the system to the phone may include indications as to whether a voice mail message was left by senders of missed calls. In some embodiments, after the missed call data is downloaded, it is purged from the server computer 300. In other embodiments, at least some of the missed call data is retained in the server computer 300.

Figure 5A:
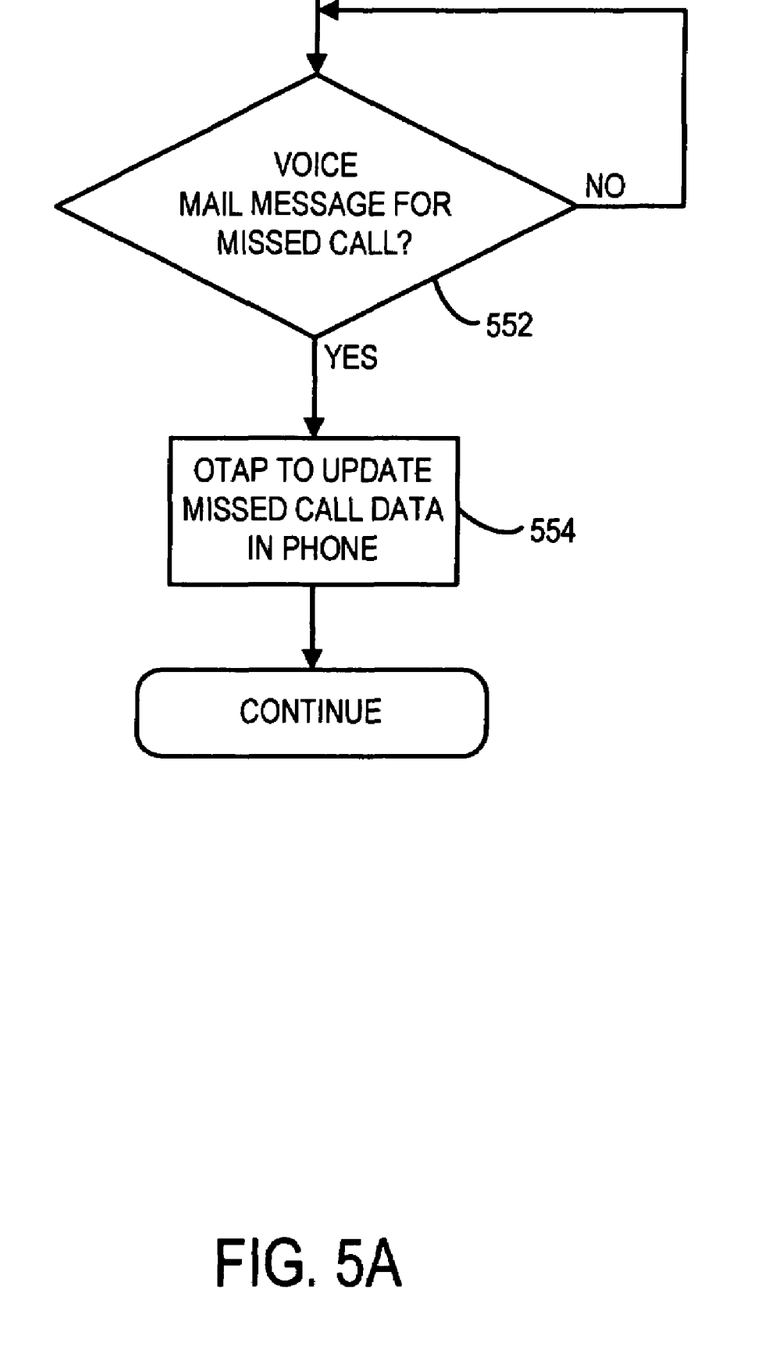

FIG. 5A is a flowchart that illustrates a process performed at least partially by server computer 300 to aid a cellular phone 102 in the cellular phone's record-keeping for missed calls.

At 552 in FIG. 5A, it is determined whether a voice mail message has been left with respect to a call that was missed because the user of the intended recipient phone rejected the call or did not answer. If a positive determination is made at 552 (i.e., if such a voice mail message was left), then the system may engage in an OTAP session (as indicated at 554) with the phone in question to download to the phone in question an indication that the voice mail message was left. Accordingly, the missed call log in the phone may be updated to include an indication that the rejected/not-answered call resulted in a voice mail message.

Figure 6:
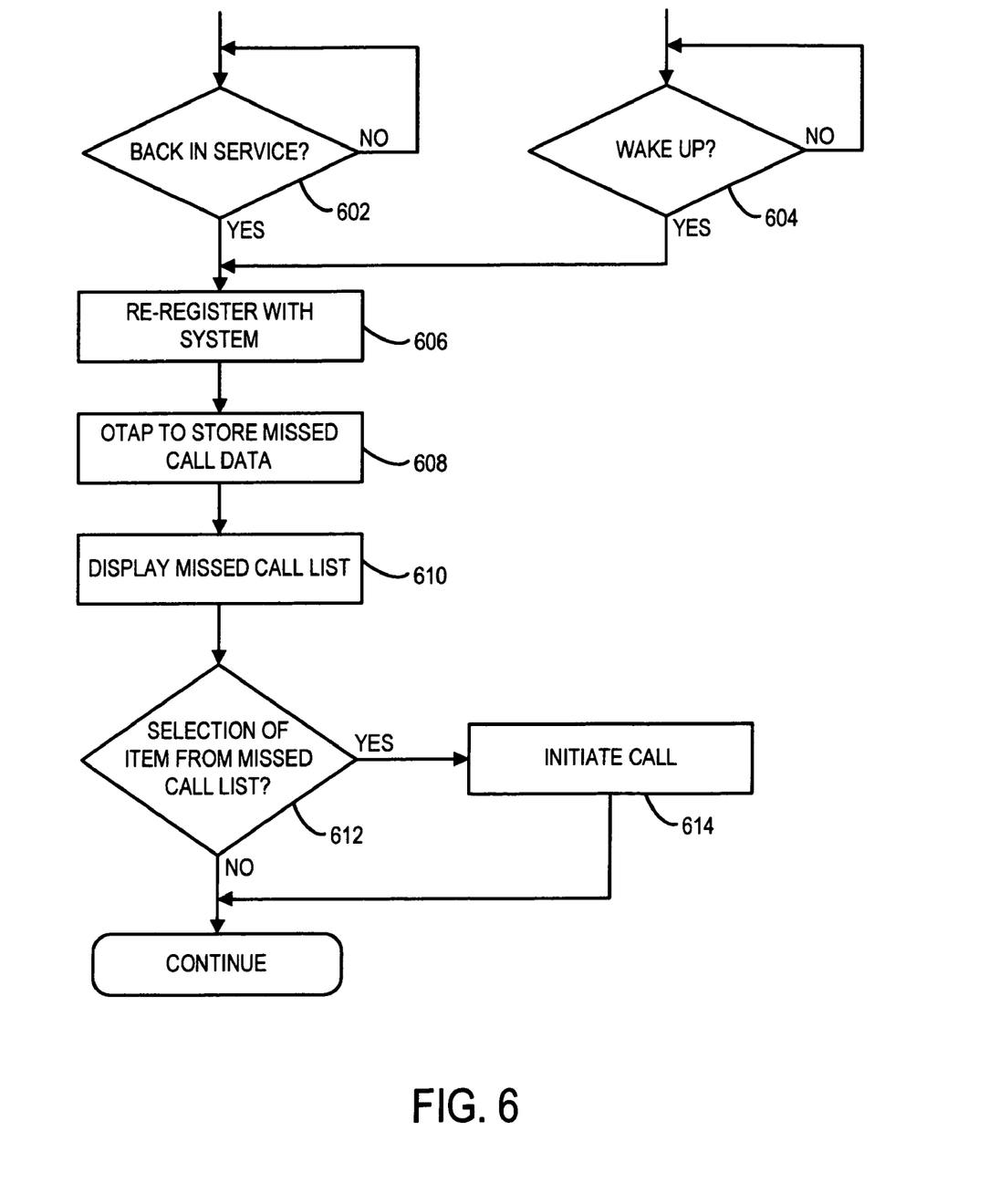
FIG. 6 is a flowchart depicting a process performed by the cellular phone of FIG. 2 according to some aspects of the invention.

FIG. 6 is a flowchart depicting a process performed by the cellular phone 102 according to some aspects of the invention.

At 602, the cellular phone 102 determines whether it has returned to an area of signal coverage for the system 100. Alternatively, at 604, the cellular phone determines whether it has been turned on and so should resume normal functioning. In the case of either returning to signal coverage or being turned on, the phone takes steps to re-register with the system 100, as indicated at 606.

Assuming that there was at least one missed call while the phone was out of service, the system 100 engages in OTAP with the phone to download the missed call data to the phone. Block 608 indicates participation of the phone in the OTAP session to receive and store the missed call data. In some embodiments, the missed call data is stored in the phone by the system programming the SIM 227 (FIG. 2) of the phone.

Figure 7:
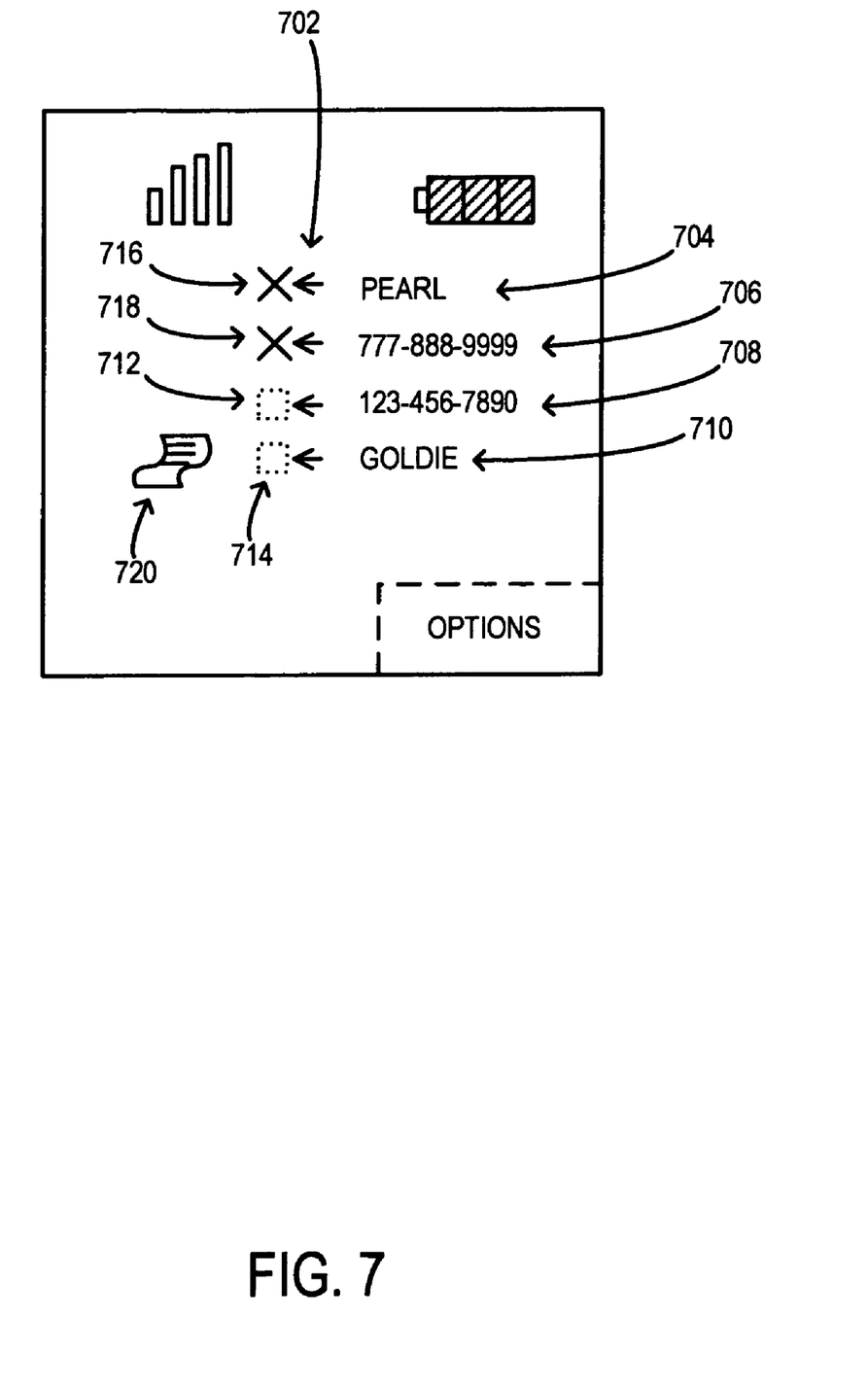
FIG. 7 is a representation of a display output that may be provided by the cellular phone of FIG. 2 according to some aspects of the invention.

Once the missed call data has been stored in the phone, the phone may display a missed call list, as indicated at 610 in FIG. 6. The missed call list may be displayed by the phone in response to the OTAP session (i.e., spontaneously) or in response to input from the phone's user requesting display of the missed call list. It will be appreciated that the missed call list is displayed on the display component 240 of the phone. FIG. 7 is a representation of a display provided in accordance with aspects of the invention to present the missed call list to the user of the phone.

Indicated at 702 in FIG. 7 is at least a portion of a missed call list. The missed call list includes list items 704, 706, 708 and 710 in this example. Each of the list items includes an icon to indicate whether the call was missed because the phone was out of service (icons 712, 714, in items 708, 710, respectively) or because it was rejected/not answered (icons 716, 718, in items 704, 706, respectively). In addition, list item 710 includes an icon 720 which indicates that the caller of the corresponding missed call left a voice mail message. It will be noted that the list items also each include the phone number or the name of the sender of the missed call. The icons 720 and 714 may together be considered a composite icon that indicates both an out of service missed call and a corresponding voice mail message. In the absence of the icon 720, the icons 716, 718, 712 may be considered to be icons that indicate that no voice mail message was left for the corresponding missed calls. In some embodiments, another icon may be provided to positively indicate that no voice mail message was left. In some embodiments, the type of icon referred to in the previous sentence may be used to indicate calls for which no voice mail message was left, and the icon 720 may not be used, so that the absence of the no-message icon is taken to mean that a message was left.

From the above discussion of FIG. 5A, it may be recognized that an icon like icon 720 may be included in a missed call list item (e.g., items 704, 706) for a rejected/not-answered missed call, in the event that the corresponding rejected/not-answered call resulted in a voice mail message being left.

The user of the cellular phone may interact with the missed call list to conveniently initiate return telephone calls to the senders of the missed calls. As indicated at 612 in FIG. 6, it may be determined whether the user has selected a particular list item (e.g., item 708, FIG. 7) from the missed call list. If so (and possibly if the user has selected an appropriate option from the phone's user interface) then the phone may make a call (as indicated at 614 in FIG. 6) to the sender of the missed call that corresponds to the selected missed call list item.

With the processes described herein, users of cellular phones may be conveniently informed of missed calls that result from the phones being out of service, and information regarding such missed calls may be integrated in a missed call list maintained in the phone with other types of missed calls. The missed call list may also be a vehicle for the user to readily make call backs to the senders of the missed calls, including missed calls resulting from the phone being out of service.

The flowcharts described herein do not necessarily imply a fixed order to the actions, and embodiments may be performed in any order that is practicable.

Although the system has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method of operating a cellular telephone system, comprising:
    detecting that a first telephone call to a cellular telephone cannot be completed due to a lack of wireless connection to the cellular telephone;
    storing data indicative of said first telephone call in a device other than said cellular telephone;
    determining whether a corresponding voicemail message is associated with said first telephone call;
    detecting that said cellular telephone is re-connected to said system;
    sending to said cellular telephone, in response to said detecting that said cellular telephone is re-connected to said system, data indicative of said first telephone call;
    storing at least some of said data indicative of said first telephone call in a missed call list in said cellular telephone; and
    displaying said missed call list on a display of said cellular telephone, said missed call list including an icon that indicates both said first telephone call and said corresponding voicemail message associated with said first telephone call.

2. The method of claim 1, further comprising:
    initiating a telephone call from said cellular telephone to a sender of said first telephone call by interacting with an item in said missed call list that corresponds to said first telephone call.

3. The method of claim 1, further comprising:
    storing, in said missed call list, data representing a second telephone call that was missed as a result of a user of said cellular telephone failing to answer said second telephone call.

4. The method of claim 3, further comprising:
    displaying a first missed calf list item which corresponds to said first telephone call, said first item including a first icon; and
    displaying a second missed call list item which corresponds to said second telephone call, said second item including a second icon that has a different appearance from said first icon.

5. The method of claim 4, wherein said first and second items are displayed simultaneously on a display component of said cellular telephone.

6. The method of claim 4, further comprising:
    displaying a third missed call list item which corresponds to a third telephone call for which a sender of said third telephone call did not leave a voice mail message, said third item including a third icon which has a different appearance from said first and second icons.

7. A method of operating a cellular telephone, comprising:
    receiving a data message by said cellular telephone, said data message including data that represents a first telephone call to the cellular telephone, said first telephone call having failed to be completed to said cellular telephone due to a lack of wireless connection to the cellular telephone; and
    storing at least some of said data in a missed call list in said cellular telephone; and
    displaying said missed call list on a display of said cellular telephone, said missed call list including an icon that indicates both said first telephone call and a corresponding voicemail message associated with said first telephone call.

8. The method of claim 7, further comprising:
    initiating a telephone call from said cellular telephone to a sender of said first telephone call by interacting with an item in said missed call list that corresponds to said first telephone call.

9. The method of claim 7, further comprising:
    storing, in said missed call list, data representing a second telephone call that was missed as a result of a user of said cellular telephone failing to answer said second telephone call.

10. The method of claim 9, further comprising:
    displaying a first missed call list item which corresponds to said first telephone call, said first item including a first icon; and
    displaying a second missed call list item which corresponds to said second telephone call, said second item including a second icon that has a different appearance from said first icon.

11. The method of claim 10, wherein said first and second items are displayed simultaneously on a display component of said cellular telephone.

12. The method of claim 7, wherein said data message includes data to indicate whether a sender of said first telephone call left a voice mail message.

13. The method of claim 12, wherein said storing includes generating a missed call list item that includes an icon, said icon to indicate that the sender did not leave a voice mail message.

14. A cellular telephone comprising:
    a processor;
    communication means, operatively coupled to the processor, for receiving and transmitting information;
    a display component operatively coupled to the processor;
    a microphone operatively coupled to said communication means;
    a speaker operatively coupled to said communication means; and
    a memory operatively coupled to the processor and storing software adapted to control the processor to:
        receive a data message, said data message including data that represents a first telephone call to the cellular telephone, said first telephone call having failed to be completed to said cellular telephone due to a lack of wireless connection to the cellular telephone;
        determine whether a corresponding voicemail message is associated with said first telephone call;

store at least some of said data in a missed call list in said cellular telephone; and display said missed call list on said display component, said missed call list including an icon that indicates both said first telephone call and said corresponding voice-mail message associated with said first telephone call.

15. The cellular telephone of claim 14, wherein the software stored in the memory is further adapted to control the processor to initiate a telephone call to a sender of said first telephone call in response to a user of said cellular telephone interacting with an item in said missed call list that corresponds to said first telephone call.

16. The cellular telephone of claim 14, wherein the software stored in the memory is further adapted to control the processor to store, in said missed call list, data representing a second telephone call that was missed as a result of a user of said cellular telephone failing to answer said second telephone call.

17. The cellular telephone of claim 16, wherein the software stored in the memory is further adapted to control the processor to:

display on said display component a first missed call list item which corresponds to said first telephone call, said first item including a first icon; and display on said display component a second missed call list item which corresponds to said second telephone call, said second item including a second icon that has a different appearance from said first icon.

18. The cellular telephone of claim 14, wherein said first and second items are displayed simultaneously on a display component of said cellular telephone.

19. The cellular telephone of claim 17, wherein said data message includes data to indicate whether a sender of said first telephone call left a voice mail message.

20. The cellular telephone of claim 19, wherein said storing includes generating a missed call list item that includes an icon, said icon to indicate that the sender did not leave a voice mail message.

* * * * *